United States Patent
Norin

(10) Patent No.: US 6,272,679 B1
(45) Date of Patent: Aug. 7, 2001

(54) DYNAMIC INTERFERENCE OPTIMIZATION METHOD FOR SATELLITES TRANSMITTING MULTIPLE BEAMS WITH COMMON FREQUENCIES

(75) Inventor: John L. Norin, Los Angeles, CA (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/160,600

(22) Filed: Sep. 25, 1998

Related U.S. Application Data
(60) Provisional application No. 60/062,003, filed on Oct. 17, 1997.

(51) Int. Cl.$^7$ .................................................. H04Q 7/36
(52) U.S. Cl. .............................. 725/62; 725/67; 725/63; 455/13.4; 455/522
(58) Field of Search .............................. 455/13.1, 13.4, 455/427, 429, 430, 63, 522, 103, 562, 503, 502, 453, 3.2; 725/67, 62, 63; 370/318, 323, 329

(56) References Cited

U.S. PATENT DOCUMENTS

| | | | |
|---|---|---|---|
| 4,163,942 | * 8/1979 | Acampora et al. | ...... 455/63 |
| 4,298,873 | * 11/1981 | Roberts | ...... 342/375 |
| 4,689,625 | * 8/1987 | Barmat | ...... 342/356 |
| 4,855,751 | * 8/1989 | Ingerson | ...... 343/779 |
| 5,285,208 | * 2/1994 | Bertiger et al. | ...... 455/13.4 |
| 5,410,731 | * 4/1995 | Rouffet et al. | ...... 455/13.1 |
| 5,539,730 | * 7/1996 | Dent | ...... 370/280 |
| 5,669,062 | * 9/1997 | Olds et al. | ...... 455/509 |
| 5,822,680 | * 10/1998 | Stuart et al. | ...... 455/12.1 |
| 5,875,180 | * 2/1999 | Wiedeman et al. | ...... 370/320 |
| 5,924,015 | * 7/1999 | Garrison et al. | ...... 455/13.4 |
| 5,966,371 | * 10/1999 | Sherman | ...... 370/320 |
| 6,020,845 | * 2/2000 | Weinberg et al. | ...... 342/354 |

\* cited by examiner

*Primary Examiner*—Dwayne Bost
*Assistant Examiner*—Jean A. Gelin
(74) *Attorney, Agent, or Firm*—T. Gudmestad

(57) ABSTRACT

A dynamic method for optimizing interference levels between multiple downlink beams transmitted from a satellite with a common frequency spectrum causes the power level of at least one of the interfering beams to be adjusted so as to produce desired interference levels within the beams' respective ground target areas. The beam power adjustments are preferably accomplished by varying the drive levels of the high power amplifiers on board the satellite, at least one of which is initially operated at less than its maximum rated power level. Single or multiple beam powers can be adjusted, either up, down or some up and some down. Power level adjustments are normally made in response to actual beam power profiles not matching design standards, to changing service priorities among the different beam target areas, and to changing signal power requirements for the different beams.

22 Claims, 3 Drawing Sheets

DYNAMIC INTERFERENCE OPTIMIZATION METHOD FOR SATELLITES TRANSMITTING MULTIPLE BEAMS WITH COMMON FREQUENCIES

This application is a regular application of provisional application Ser. No. 06/062,003, filed on Oct. 17, 1997.

BACKGROUND OF THE INVENTION

1. Field of the Invention

This invention relates to satellite broadcast methods, and more particularly to multi-beam satellite transmission in which different beams use the same co-polarized frequency spectrum and can interfere with each other.

2. Description of the Related Art

A satellite broadcast system has been developed that is particularly useful for direct television broadcast to relatively small local service areas, as well as to larger regional areas. The system, described in co-pending U.S. patent application Ser. No. 09/160,681 filed on the same day as this application and entitled "Non-uniform Multi-beam Satellite Communications System and Method", employs a series of relatively small "spot" beams to provide local service to higher population markets. A frequency re-use scheme is used in which at least some of the separate beams are broadcast re-using the same frequency spectrum in a non-uniform beam pattern. The target areas for beams which use the same frequencies must not overlap, thereby avoiding excessive interference. Priories are established among different target areas by assigning different sizes and powers to their respective transmission beams, with the higher power beams accommodating a larger number of station signals and also resulting in a lower interference level from other beams. The priorities among different target areas can also be set by the selection of antenna reflector sizes to produce different roll-off characteristics for different beams, and by varying the illumination tapers of different antenna feedhorns to establish different peak-to-edge power differentials for different beams.

To optimize the system's frequency re-use efficiency, some amount of interference is permitted between nearby beams using overlapping or equal frequency bands. For satellite signal transmissions that,are performed digitally, cross-beam interference and thermal noise are generally not perceived as a constant degradation in the signal quality when the system is operating according to design. Rather, higher noise and interference levels can increase the duration and frequency of total signal outages during rain, thunderstorms or other bad weather conditions. The problem for a properly operating system is not one of signal quality, which is always high for a digital system when the signal is received, but of the number and duration of outages. In the past this has been addressed by spacing beams with different signals in the same frequency band so far apart that there is essentially no overlap between them, even in their peripheral areas.

With the system described in co-pending Ser. No. 09/160,681, some degree of cross-beam interference is permitted but it is kept to tolerable levels within each target area (relative to the importance of the market served in that area). However, if the satellite's worse case performance for a given target area is slightly worse than expected, the transmission may not work at all in the peripheral portions of the target area, where the ratio of the beam's carrier power C to the cross-beam interference I is dropping rapidly. The C/I ratio increases towards the center of the beam, where the transmission is limited only by weather conditions which can produce temporary outages, as opposed to the more remote areas where there can be no successful transmission at all if interference is worse than expected.

Even if a satellite broadcast system conforms exactly to the original design, circumstances can change in a way that would obsolete the originally designed interference levels. For example, a higher outage rate will generally be tolerated for an area that has both a low overall population and a low population density. A greater loss of service to this type of area would be a reasonable trade-off if it resulted in a commensurate enhancement of service to an adjacent area with a much higher population. However, if the sparsely populated area is growing rapidly, over time its population may increase to a level at which a relatively high outage rate is no longer acceptable. In this situation the original design will be self-defeating, since it will ultimately result in the assignment of outage rates to different areas on a basis other than the relative importance of the current markets in those areas. Furthermore, as the population within a particular market area increases there is a tendency to enlarge the number of different station signals within its channel. This reduces the power available for each individual station signal and leads to an absolute increase in interference effects from adjacent beams, which is exactly the opposite of what is normally desirable for an area with a rapidly growing population.

SUMMARY OF THE INVENTION

The present invention seeks to provide a frequency reuse signal broadcast method that is particularly useful for direct television satellite broadcasts and can be used to maintain a desirable correlation between the service quality for different areas and the market importance of those areas, despite variances between the designed and actual system performances, changes in the relative importance of adjacent target areas through population shifts or otherwise, and reductions in the power of individual station signals resulting from increases in the total number of stations per channel for a given target area.

These goals are achieved with a dynamic system that adjusts the power level of at least one of multiple interfering beams when the beam interference levels within their respective target areas do not satisfy present desired levels. High power amplifiers are used to amplify the channels prior to transmission, and the power level adjustment is accomplished by varying the drives to the amplifiers for the beams whose power is to be adjusted. Despite the fact that it is normally desirable to operate high power amplifiers at close to their maximum power ratings, at least one of the satellite amplifiers is preferably deliberately operated (at least initially) at significantly less than this level to leave room for a later adjustment.

Power adjustments can be made to either one or more beams by increasing the power level (except for beams already operating at maximum power), reducing power levels, and/or increasing the power levels of some beams while reducing the power levels of others. An adjustment to a given beam's output power is preferably made by varying the operating point on its final high power amplifier. For highly stable and controlled situations, the operating point may be adjusted from the ground using only linear gain control on the satellite. However, in most applications an automatic level control (ALC) function on the satellite is used to maintain a stable operating point during rain fade and uplink antenna pattern fluctuations.

These and further features and advantages of the invention will be apparent to those skilled in the art from the following detailed description, taken together with the accompanying drawings.

DETAILED DESCRIPTION OF THE INVENTION

Figure 1:
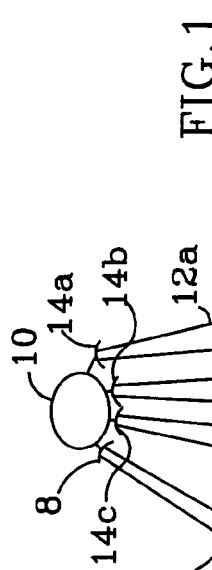
FIG. 1 is an illustrative diagram of a multi-beam satellite system to which the invention is applicable.

FIG. 1 illustrates the primary application for the invention, which is the satellite broadcast of local service direct television programming, preferably together with larger regional broadcasts. However, the invention is not limited to television signals, and is applicable to spacecraft communications in general.

An uplink beam 2 is transmitted from a ground station 4 on the earth's surface 6 to an uplink antenna 8 on an orbiting satellite 10. The uplink signal is processed by the satellite circuitry and transformed to a series of downlink signals, which are transmitted back to earth as broadcast beams 12a, 12b, 12c from respective downlink antennas 14a, 14b, 14c. More than one beam will normally be transmitted from each antenna, with the beam directionalities determined by the positions of the antenna feedhorns which are excited by each channel, relative to the antenna reflectors. Some of the beams can be smaller "spot" beams for local direct television service, while other beams can be for larger regional service areas. The type of feedhorn employed and the size of the antenna reflector determine the size of each beam.

Figure 2A:
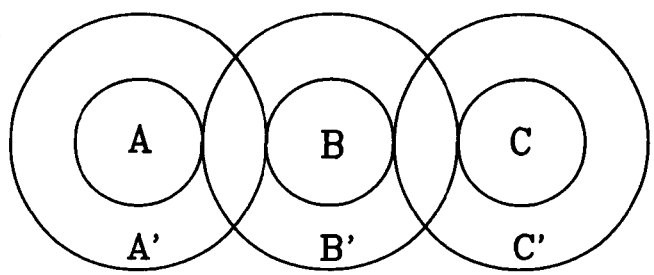
FIG. 2a is a projection of beam contours on the ground.
Figure 2B:
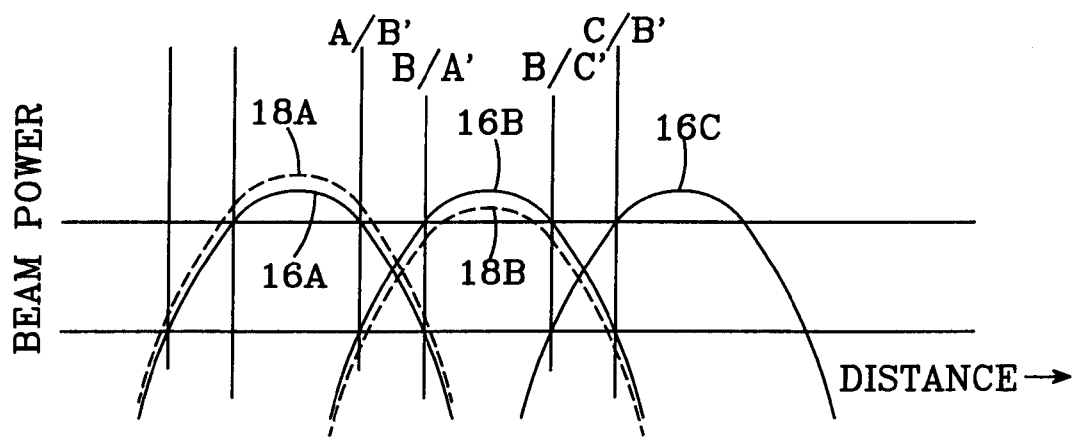
FIG. 2b is a graph of individual beam powers for the beams shown in FIG. 2a, before and after adjustment.

The principles of the invention are illustrated in FIGS. 2a and 2b. FIG. 2a is a plan view of the projection of three representative downlink beams A, B and C, all of which are assumed to carry broadcast signals within the same channel (frequency spectrum), on the ground. The service area for each beam is indicated by the inner circle marked with the letter of that beam. The peripheral beam portions outside of their intended service areas are indicated by the same letter, with the addition of a prime. Thus, the target areas for beams A, B and C are all spaced apart from each other, but the peripheral portion of one beam may extend up to and into the target area for an adjacent beam.

FIG. 2b is an exemplary graph of possible power levels for the three beams as a function of distance along the ground. The power distribution for each beam corresponds to a generally sinusoidal lobe, peaking at or near the center of the target area and decreasing at a progressively greater rate further away from the target area center. The three beam power profiles when the system is first established are indicated by solid curves 16A, 16B and 16C, corresponding to beams A, B and C, respectively. In the figure the beams are shown close enough together so that each one extends into the target area of the next adjacent beam, but at a much reduced power level. The location at which beam B extends into the target area for beam A is indicated by A/B', the location at which beam A extends into the target area for beam B is indicated by B/A' etc.

If the actual beam power profiles match the design levels, the amount of interference between adjacent beams will be within design tolerances. However, if it turns out that the power of one beam is significantly higher than the design level where it crosses into the target area for another beam, it can produce excessive interference with the other beam and disturb reception in the other beam's target area beyond planned levels. Conversely, if the power of a given beam is lower near its peripheral area than originally designed, it can suffer excessive interference from adjacent beams. Even if the cross-beam interference levels initially satisfy design requirements, changes in population or in the number of station signals to be broadcast to a given area may over time cause these interference levels to no longer be satisfactory.

The invention takes a dynamic approach to these problems by providing a mechanism to adjust and balance the various beam powers, either upon the initial establishment of the satellite broadcast system or years later when the operating environment has changed. Assume, for example, that beam B is causing too high a level of interference in the beam A target area, either initially or after conditions have changed. In response, the power level for beam A is increased as indicated by dashed line 18A, or the power level of beam B can be reduced as indicated by dashed line 18B, or beam A can be strengthened and beam B weakened concurrently. An increase in a beam's carrier level not only reduces the relative amounts of interference from adjacent beams, but also increases the beam's carrier-to-noise ratio (C/N), which in turn further enhances service.

The choice of which type of adjustment to make will depend upon its effect on other beams and upon the initial operating levels of the high power amplifiers on board the satellite. For example, if increasing beam A's power level would result in too high an increase in its interference with a third beam, the power of beam B might be lowered instead of increasing the beam A power. However, if lowering the beam B power would cause it to suffer undue interference from beam C, the solution could be to increase the beam A power and reduce the beam B power, but both by amounts less than if only one beam were adjusted.

It is generally desirable to operate the high power amplifiers for the downlink beams at levels close to maximum rated capacity for greatest efficiency (absolute maximum power levels are normally avoided for non-linear amplifiers because of inefficiencies associated with absolute peak power). However, to most successfully implement the invention at least some of the downlink beam high power amplifiers are set at initial operating points further below their maximum power ratings to allow room for upward adjustments of the power levels for these beams. In FIG. 2b, beam A is initially operated at significantly less than its amplifier's maximum power rating, since there is room left to increase this beam's power upward to curve 18A.

The adjustment of a given beam's output power is made by varying the operating point on its final high power amplifier, which is generally a traveling wave tube or a solid state power amplifier for commercial satellites. For highly stable and controlled situations, the operating point may be adjusted from the ground using only linear gain control on the satellite. However, most broadcast applications will require the use of an ALC function on the satellite to maintain a stable operating point during rain fade and uplink antenna pattern fluctuations.

Figure 3:
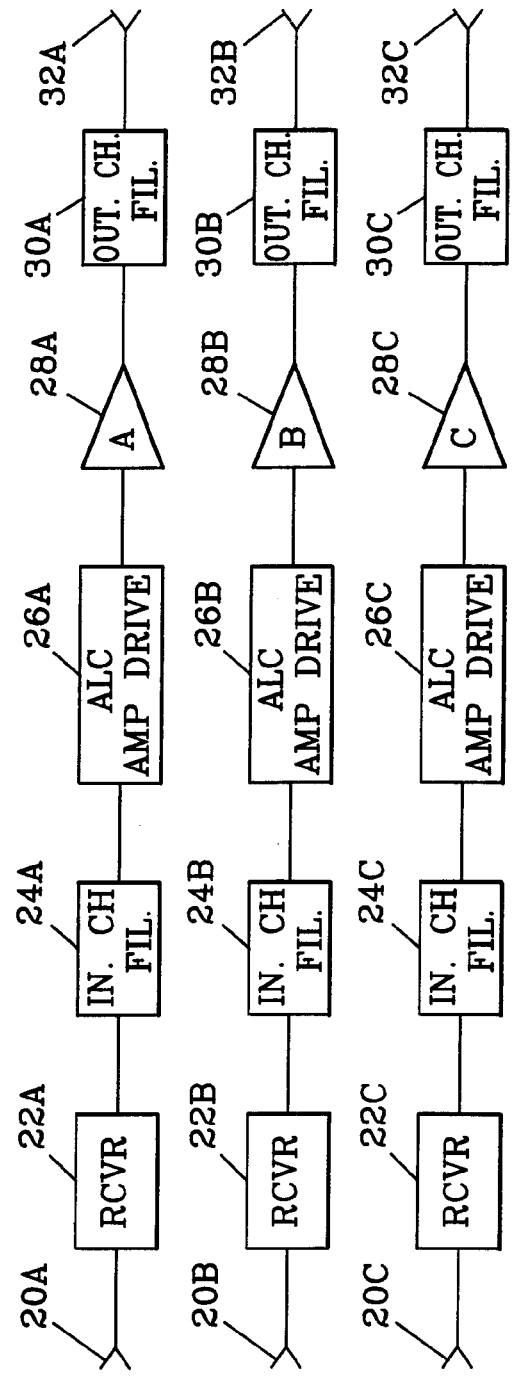
FIG. 3 is a block diagram of three satellite channel circuits used to produce the beams illustrated in FIG. 2.

FIG. 3 is a simplified block diagram illustrating the basic satellite repeater circuitry used to generate three beams such as A, B and C in FIG. 2a. The same basic circuit architecture can be used for each beam. An uplink antenna 20A receives an uplink signal from the ground station and delivers it to a conventional receiver 22A, which includes a broadband low noise amplifier and a frequency converter that converts the signal from its uplink to its downlink frequency band. From the receiver the signal is channelized by an input channel filter 24A and sent to an ALC/amplifier drive circuit 26A that provides the beam power adjustment capability, as explained in more detail below. The signal is then processed by a high power amplifier 28A and an output channel filter 30A, and transmitted back to earth as a downlink beam from downlink antenna 32A. Similar circuitry is provided for other uplink beams B and C, which re-use the same frequency spectrum as beam A, and the same reference numbers are used in FIG. 3 as for beam A, with the reference number suffixes changed to B and C.

Figure 4B:
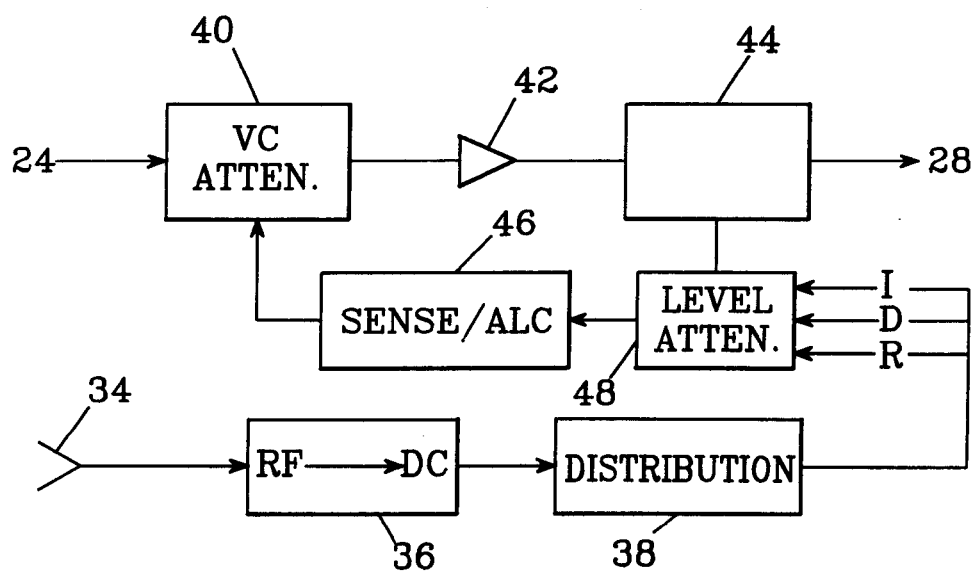
FIGS. 4a and 4b are block diagram of two possible power amplifier drive control circuits.
Figure 4A:
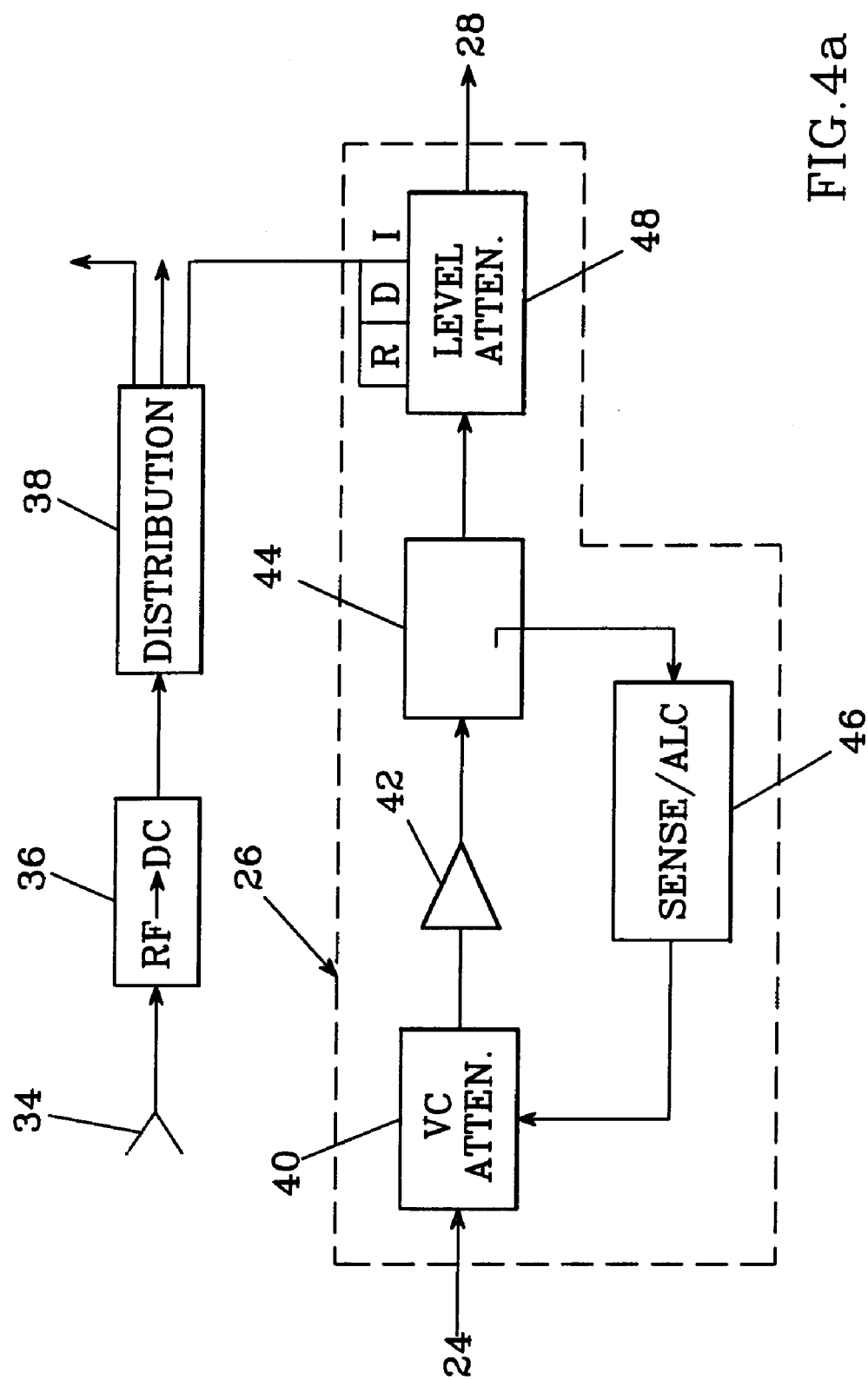

FIG. 4a shows one embodiment of a beam amplification adjustment circuit. Once it is determined that a power adjustment is needed, a command signal is transmitted from the ground station to a receive antenna 34 on the satellite, which can be either a dedicated command antenna or a more general communications antenna coupled with a signal router to route command signals to a command receiver (not shown). The received command signal is applied to an RF-to-DC converter 36 which outputs a corresponding DC command signal to a distribution circuit 38 for routing to the specific beam circuit identified in the command signal.

The ALC/amplifier drive circuit 26 is preferably designed to optimize performance in marginal C/I environments. A known system to accomplish this includes a control loop with a voltage controlled attenuator 40 that receives a filtered input signal (from bandpass filter 24A, 24B or 24C in FIG. 3) and delivers an output to a pre-amplifier 42. The pre-amplified signal is sampled by a directional coupler 44, with the sample delivered to a sense/ALC circuit 46 that senses the power level of the sampled RF signal, converts it to DC, and provides an ALC function. The output of sense/ALC circuit 46 is delivered as a DC control signal back to voltage controlled attenuator 40 to complete a control loop consisting of elements 40, 42, 44 and 46. The control loop has a time constant that prevents it from oscillating, with the sense/ALC circuit 46 damping the sampled signal to prevent instantaneous feedback, yielding a response time on the order of milliseconds. As a result the control loop responds to the average power in the input signal, not to the carrier itself.

The output of pre-amplifier 42 is delivered through directional coupler 44 as an input to a commandable output level attenuator 48, which receives the power adjust command signal from the command signal distribution circuit 38. The output level attenuator 48 preferably includes inputs to increment (I), decrement (D) or reset (R) the degree of attenuation; the reset input can be dispensed with if desired. The output of the level attenuator 48 is delivered to the corresponding high power amplifier 28A, 28B or 28C. Reductions in the output power level are achieved with a command signal that increments the level attenuator circuit to increase its signal attenuation, whereas increases in output power are achieved by decrementing the level attenuator circuit to reduce the amount of signal attenuation.

An alternate circuit which responds to power level command signals in an opposite fashion, by increasing the output power in response to an increment command and reducing the output power in response to a decrement command, is shown in block diagram form in FIG. 4b. This circuit is similar to that shown in FIG. 4a, but the commandable out-put level attenuator 48 is moved into the control loop to receive an input from the directional coupler 44 and deliver an output to the sense/ALC circuit 46. The level attenuator circuit 48 receives command signals in the same manner as in FIG. 4a. However, moving it into the control loop causes the output to the high power amplifier to vary with the command signal in a fashion opposite to FIG. 4a. In both embodiments the drive level steps adjusting the high power amplifier's operating point should be designed to achieve the anticipated output level granularity required for adjustments to the beam C/I ratio.

While particular embodiments of the invention have been shown and described, numerous variations and alternate embodiments will occur to those skilled in the art. Accordingly, it is intended that the invention be limited only in terms of the appended claims.

I claim:

1. A frequency reuse television signal broadcast method, comprising:

transmitting multiple satellite television signal beams having overlapping frequency bands to different respective earth target areas so that only peripheral portions of at least one pair of said beams spatially overlap to cause cross-beam interference between said beams within said spatial overlap, and adjusting the power level of at least one of the interfering beams, while leaving their target areas substantially unchanged, to produce a desired substantially non-zero cross-beam interference level within said spatial overlap, while leaving both of said interfering beams with substantially non-zero power levels.

2. The method of claim 1, wherein the signals for each of said beams are amplified by respective amplifiers prior to transmission, and said power level adjustment is accomplished by varying the amplification drives to the amplifiers for the beams whose power is adjusted.

3. The method of claim 2, wherein at least one of said amplifiers is initially operated at less than its maximum rated power level prior to said adjustment.

4. The method of claim 3, wherein said power level adjustment is accomplished by increasing the amplification drive to at least one of said amplifiers initially operated at less than its maximum rated power level.

5. The method of claim 3, wherein the signals provided to said amplifiers are automatic level controlled prior to amplification.

6. The method of claim 1, wherein said beam power level adjustment is initiated in response to power control commanding signals transmitted to the satellite from a ground location.

7. The method of claim 1, wherein said interfering beams have substantially equal frequency bands.

8. The method of claim 1, said beams having respective maximum power levels, wherein at least one of said beams is initially operated at less than its maximum power level and said adjustment is accomplished by increasing the power level of that beam.

9. The method of claim 8, wherein said adjustment is further accomplished by reducing the power level of a beam which interferes with the beam whose power level is increased.

10. The method of claim 1, wherein said adjustment is accomplished by reducing the power level of an interfering beam.

11. The method of claim 1, wherein said beams are transmitted to cause interference within multiple target areas and the power levels of multiple beams are adjusted to adjust the interference levels within said multiple target areas.

12. A frequency reuse television signal broadcast method, comprising:

establishing desired cross-beam interference levels within specified earth target areas for television signal beams to be broadcast to respective ones of said target areas with overlapping frequency bands, transmitting said beams by satellite to said target areas with a common polarization and so that the beams spatially overlap to produce a substantially non-zero frequency based cross-beam interference within said overlapping bands, comparing the actual cross-beam interference levels resulting from said transmissions to said desired levels, and adjusting the power level of at least one of said beams to reduce a difference between an actual and a desired cross-beam interference level, the power levels of at least some of said beams being substantially different from each other prior to and/or after said power level adjustment so that the cross-beam interference level relative to beam power is greater for a lower power beam than for its interfering higher power beam.

13. The method of claim 12, wherein the signals for each of said beams are amplified by respective variable amplifiers prior to transmission, and said power level adjustment is accomplished by varying the amplification drives to the amplifiers for the beams whose power is adjusted.

14. The method of claim 13, wherein at least one of said amplifiers is initially operated at less than its maximum rated power level prior to said adjustment.

15. The method of claim 14, wherein said power level adjustment is accomplished by increasing the amplification level of at least one of said amplifiers initially operated at less than its maximum rated power level.

16. The method of claim 14, wherein the signals provided to said amplifiers are automatic level controlled prior to amplification.

17. The method of claim 12, wherein said beam power level adjustment is initiated in response to power control signals transmitted to the satellite from a ground location.

18. The method of claim 12, wherein said interfering beams have substantially equal frequency bands.

19. The method of claim 12, said beams having respective maximum power levels, wherein at least one of said beams is initially operated at less than its maximum power level and said adjustment is accomplished by increasing the power level of that beam.

20. The method of claim 19, wherein said adjustment is further accomplished by reducing the power level of a beam which interferes with the beam whose power level is increased.

21. The method of claim 12, wherein said adjustment is accomplished by reducing the power level of an interfering beam.

22. The method of claim 12, wherein said beams are transmitted to cause interference within multiple target areas and the power levels of multiple beams are adjusted to adjust the interference levels within said multiple target areas.

* * * * *